(12) United States Patent
Saavedra et al.

(10) Patent No.: US 7,392,764 B2
(45) Date of Patent: Jul. 1, 2008

(54) CAT RESTRAINT AND CARRIER

(76) Inventors: Daniel R. Saavedra, Highway 287 S. Route 1, Wildwood Refuge, Grapeland, TX (US) 75844-0423; Nancy Fritts-Saavedra, Highway 287 S. Route 1, Wildwood Refuge, Grapeland, TX (US) 75844-0423

( * ) Notice: Subject to any disclaimer, the term of this patent is extended or adjusted under 35 U.S.C. 154(b) by 0 days.

(21) Appl. No.: 11/200,859

(22) Filed: Aug. 10, 2005

(65) Prior Publication Data

US 2006/0032457 A1    Feb. 16, 2006

Related U.S. Application Data

(60) Provisional application No. 60/599,951, filed on Aug. 10, 2004.

(51) Int. Cl.
*A01K 1/00* (2006.01)
*A01K 31/07* (2006.01)

(52) U.S. Cl. ...................... 119/497; 119/453

(58) Field of Classification Search .......... 119/497, 119/496, 452, 453, 454, 482, 512, 712, 678, 119/729, 751; D30/108, 109; 383/66
See application file for complete search history.

(56) References Cited

U.S. PATENT DOCUMENTS

| 3,023,734 | A | * | 3/1962 | Schaub | 119/729 |
| 3,156,213 | A | * | 11/1964 | Patten | 119/497 |
| 3,547,079 | A | * | 12/1970 | Bassett | 119/497 |
| 3,850,144 | A | * | 11/1974 | Springer et al. | 119/497 |
| 3,941,092 | A | * | 3/1976 | Winters | 119/497 |
| 4,220,119 | A | * | 9/1980 | Albright | 119/497 |
| 4,977,857 | A | * | 12/1990 | Slawinski | 119/497 |
| 5,632,231 | A | * | 5/1997 | Moore | 119/671 |
| 6,338,318 | B1 | * | 1/2002 | Apichom | 119/497 |

* cited by examiner

*Primary Examiner*—T. Nguyen
(74) *Attorney, Agent, or Firm*—Patwrite LLC; Mark David Torche

(57) ABSTRACT

An animal restraint and carrier is disclosed which comprises a generally rectangular case hinged to permit at least one side to open and an adjoining side having an opening sized to permit an animal enclosed in the case to extend its head and neck. An optional clamping device surrounding the opening may be closed on the neck to restrain the animal's head to facilitate treating or cleaning ears, eyes or teeth and the giving of oral medications. The case is preferably sized such that when closed the animal may stand comfortably, but not turn around within the case. One or more sides of the case may be equipped with hinged openings to permit access to certain areas of an enclosed animal's body—e.g., the back.

10 Claims, 2 Drawing Sheets

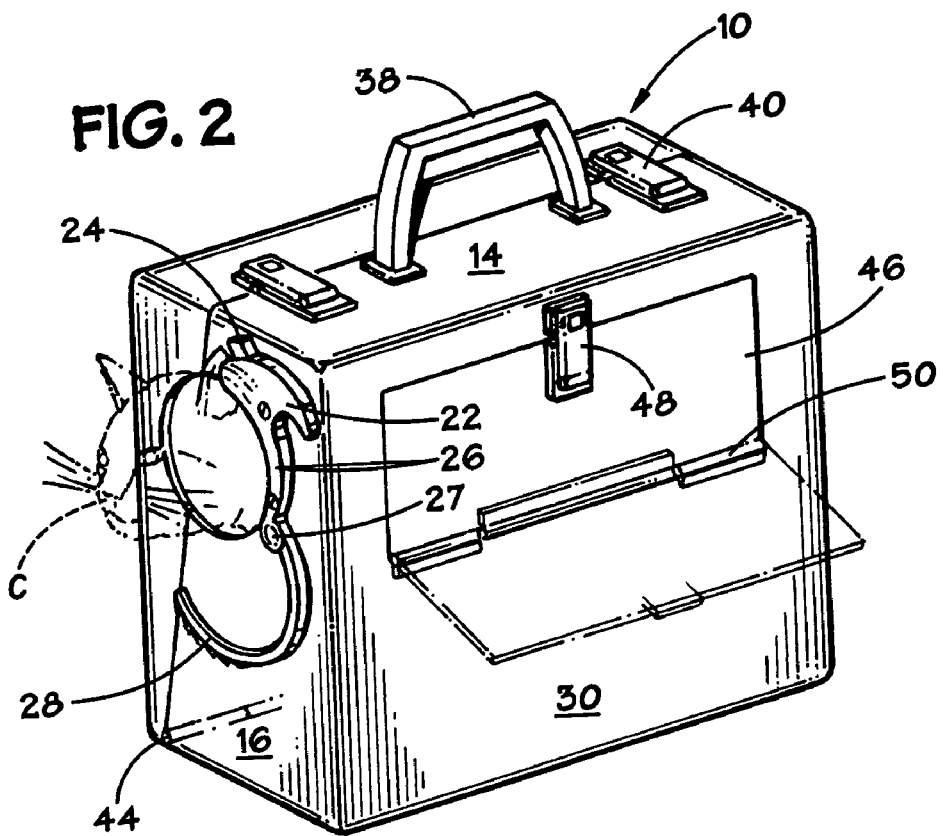
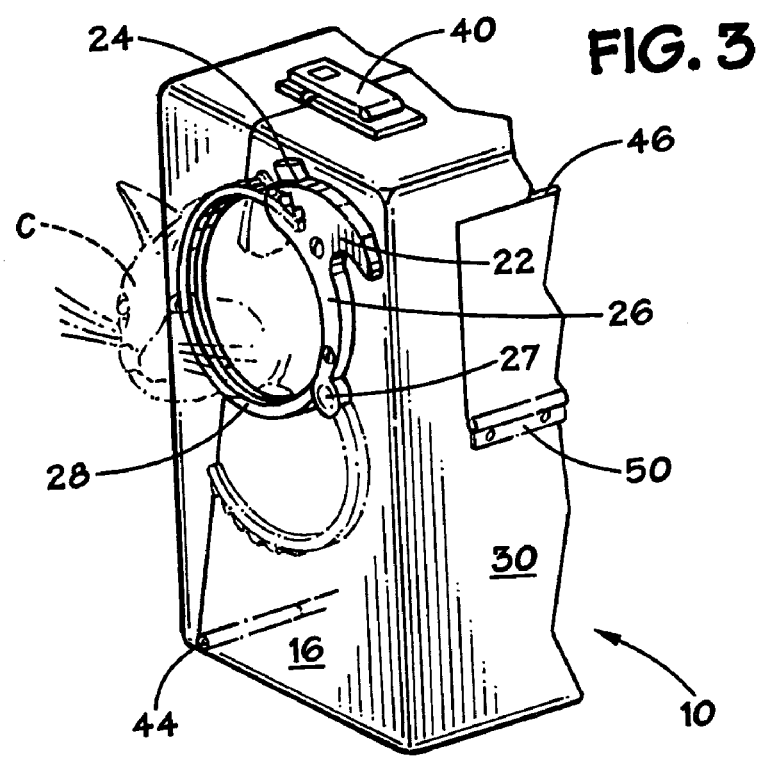

CAT RESTRAINT AND CARRIER

CROSS-REFERENCE TO RELATED APPLICATIONS

This application claims the benefit of U.S. Provisional Patent Application Ser. No. 60/599,951 filed Aug. 10, 2004, the disclosure of which is hereby incorporated by reference in its entirety.

BACKGROUND OF THE INVENTION

1. Field of the Invention

This invention relates to animal carriers and restraints. More particularly, it relates to a restraint and carrier for domestic cats that is specially adapted for medical treatment.

2. Description of the Related Art

The domestic cat (Felis catus) is notoriously difficult to handle during medical examinations and treatments. Even normally docile cats can become fractious during the application of medicines (topically or by injection), the giving of oral medications or during medical procedures. This is especially true when treating the eyes or the ears. Cat restraints are designed to control squirming and scratching and render a cat unable to injure itself or its handler.

Perhaps the most common device of the prior art is the restraint bag. Restraint bags can be used to restrain cats as well as small dogs. A common example is a washable/waterproof canvas or nylon bag with a 2-way zipper running full length over the back to permit either front or rear access. The bag may be equipped with a VELCRO™ closure on the collar and front leg openings. Additional zippers (or strips of Velcro) may be provided to allow selective exposure of a body part. Restraint bags are available in various sizes.

Cats stress very easily and a cat restraint bag may give the cat a sense of security during examination. A restraint bag also confines the cat's principal weapon (feet with claws). Flaps cut into the bag and secured with zippers or hook-and-loop type fasteners allow access to specific body areas.

Another device of the prior art for restraining felines is the leash and loop restraint. The cat is immobilized by drawing the leash taut. To keep the cat from being choked, the loop should include one leg.

Other restraints of the prior art resemble a coat sleeve. The cat will often scoot into it willingly. Holding the end of the sleeve securely around the cat's neck permits one to treat the head or tail.

The devices of the prior art, however, are not well-suited for transporting cats. What is needed is a device which serves as both a carrier and a restraint that permits access to selected parts of the body. The present invention solves this problem.

BRIEF SUMMARY OF THE INVENTION

The invention comprises a generally rectangular case hinged to permit at least one side to open and an adjoining side having an opening sized to permit an animal enclosed in the case to extend its head and neck. An optional clamping device surrounding the opening may be closed on the neck to restrain the animal and prevent it from withdrawing its head into the case.

The case is preferably sized such that when closed the animal may stand comfortably, but not turn around within the case.

One or more sides of the case may be equipped with hinged openings to permit access to certain areas of an enclosed animal's body—e.g., the back.

BRIEF DESCRIPTION OF THE SEVERAL VIEWS OF THE DRAWING

FIG. 1 is a perspective view of one particular embodiment of the invention in the open position. Also shown in FIG. 1 is an optional insert for holding medical supplies or the like.

FIG. 2 is a perspective view of the embodiment illustrated in FIG. 1 in the closed position.

FIG. 3 is a perspective view of one end of the embodiment of FIG. 1 showing an optional neck restraint in the closed position.

DETAILED DESCRIPTION OF THE INVENTION

Figure 1:
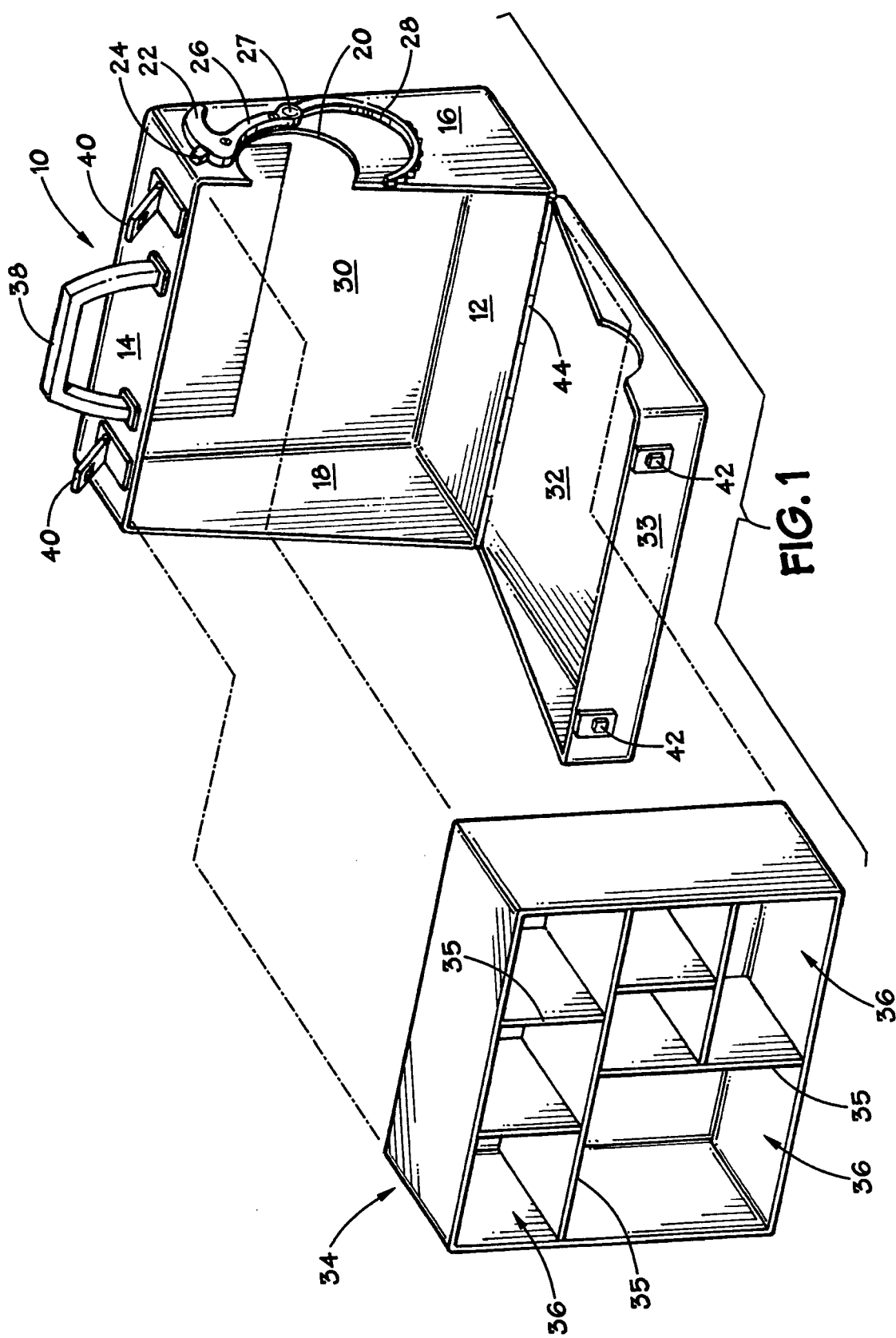

The invention may be best understood by reference to the drawing figure which illustrates one particular preferred embodiment in several views.

Referring to FIG. 1, cat carrier/restraint 10 (hereinafter "carrier 10") is a generally rectangular, suitcase-shaped box comprised of bottom 12, top 14, front side 16, back side 18, left side 30 and right side 32 which is configured to swing open on hinge 44 attached to one edge of bottom 12. In the embodiment illustrated, hinge 44 is a piano hinge. In other embodiments, particularly those of molded plastic, hinge 44 may be a living hinge comprised of a portion of surface 12 and/or 32 having a reduced thickness to permit flexing of the material.

Back side 18 is attached to or contiguous with left side 30, top 14 and bottom 12. Likewise, front 16 is attached to or contiguous with top 14, left side 30 and bottom 12. The case is preferably sized to fit the intended animal occupant such that the animal may stand comfortably, but not turn around.

The seam in the case which separates left side 30 and right side 32 is preferably angled such that bottom 12 may be full width and side 32 may include top portion 33 which, when case 10 is in the closed position, is contiguous with top 14. Having bottom 12 full width allows case 10 to be stable in both the open and closed positions when resting on bottom surface 12.

Latches 40 attached to top 40 engage catches 42 attached to top portion 33 of right side 32 to hold right side 32 in the closed position. It will be appreciated by those skilled in the art that latches 40 may be attached to top portion 33 and catches 42 attached to top 14.

Front 16 has generally circular opening 20 sized to permit the head of a cat to extend therethrough. The location of opening 20 is preferably chosen to approximate the height of the head of the animal when standing. In the illustrated embodiment, the seam in front 16 passes through opening 20. This configuration provides a more open and inviting space for the cat. In certain embodiments, opening 20 may be sized to accommodate the neck of the animal but not the head. In such embodiments, the case may be closed with the animal's head extending through opening 20 thereby restraining the head.

The illustrated embodiment also includes optional circular clamp 22 comprised of fixed portion 26 attached to front 16 and movable portion 28 attached to fixed portion 26 by pivot 27. Clamp 22 may comprise a ratchet mechanism similar to a handcuff which permits movable portion 28 to be closed to a selected extent. Clamp 22 may be opened by depressing release 24 which disengages the ratchet mechanism.

Referring now to FIGS. 2 and 3, the illustrated embodiment is shown in its closed condition with cat C in phantom. In FIG. 2, clamp 22 is open; in FIG. 3, clamp 22 is closed around the neck of cat C, effectively reducing the diameter of opening 20 to the extent that cat C cannot withdraw its head into the interior of carrier 10. In this way, the cat's head is restrained to facilitate giving oral medications or treating especially the eyes or ears of the cat.

Also shown in FIG. 2 is door 46 in left side 30. Door 46 may be opened to permit access to the back and left side of cat C. This is especially useful for making injections and the application of topical medications. Door 46 may be hinged at its bottom surface with hinge 50 attached to side 30. Hinge 50 may be of any suitable design including piano hinges and living hinges. Door 46 is secured in the closed position with door latch 48 having elements attached to both door 46 and side 30. In certain embodiments, door latch 48 may be a slide latch. In yet other embodiments, right side 32 and/or back side 18 may be equipped with doors of similar design to permit access to specific body areas.

Carrying handle 38 may be attached to top surface 14 to permit hand carrying of carrier 10. In certain embodiments, handle 38 may be a folding handle or a retractable handle.

Also illustrated in FIG. 1 is optional insert 34 which may be subdivided by partitions 35 into a plurality of compartments 36. Insert 34 is sized to fit within carrier 10 and may be used to conveniently store medical supplies and the like.

Carrier 10 may be constructed of any suitable material. Examples include molded plastic, composites, metal, and fiberboard. Insert 34 may be similarly constructed. Although described as a cat carrier and restraint, the case of the invention may be suitably sized for other small animals such as dogs.

Although the invention has been described in detail with reference to a preferred embodiment, variations and modifications exist within the scope and spirit of the invention as described and defined in the following claims.

What is claimed is:

1. A animal carrier comprising:
a case having a top, bottom, left and right side;
said case having a first end and a second end;
said first end having a generally circular opening disposed therein;
said circular opening having a circular neck clamp concentrically disposed therein;
said neck clamp having a circular first clamp section and a hingedly connected circular second clamp section;
said first clamp section being attached to an outer portion of said circular opening wherein said first clamp section is concentrically aligned with said circular opening;
a plurality of locking teeth disposed along a curved section of said second clamp section;
a releasable locking teeth engagement mechanism disposed on an end of said first clamp section wherein said second clamp section is releasably retained therein;
said case having at least one hinged section wherein said case can be opened and closed; and
at least one latch disposed to hold said case in a closed position.

2. An animal carrier as recited in claim 1 further comprising a latch for holding the door in a closed position.

3. An animal carrier as recited in claim 1 further comprising at least one latch for holding the hinged side in a closed position.

4. An animal carrier as recited in claim 1 further comprising a removable insert having a plurality of interior storage compartments.

5. An animal carrier as recited in claim 1 wherein the hinged side has a diagonal seam.

6. An animal carrier as recited in claim 5 wherein the diagonal seam passes through the generally circular opening.

7. An animal carrier as recited in claim 1 wherein the hinged side is hinged on a surface opposing the surface to which the carrying handle is attached.

8. An animal carrier as recited in claim 1 sized to permit an intended animal to stand within the case and sized to prevent an intended animal from turning around within the case.

9. An animal carrier as recited in claim 8 sized for a domestic cat of average size.

10. An animal carrier as recited in claim 1 further including a door in the side opposite the side connected to the hinge, the door sized and positioned to allow access to the body of an animal within the carrier.

* * * * *